United States Patent
Schrod

(10) Patent No.: US 6,563,252 B2
(45) Date of Patent: May 13, 2003

(54) CIRCUIT AND METHOD FOR DRIVING AT LEAST ONE CAPACITIVE ACTUATOR

(75) Inventor: Walter Schrod, Regensburg (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/100,241

(22) Filed: Mar. 18, 2002

(65) Prior Publication Data

US 2002/0121958 A1 Sep. 5, 2002

Related U.S. Application Data

(63) Continuation of application No. PCT/DE00/03206, filed on Sep. 14, 2000.

(30) Foreign Application Priority Data

Sep. 17, 1999 (DE) .......................... 199 44 733

(51) Int. Cl.[7] ............................................. H01L 41/08
(52) U.S. Cl. ................................................ 310/316.03
(58) Field of Search .................... 310/316.01, 316.03, 310/317, 318; 318/116, 118; 307/125, 130

(56) References Cited

U.S. PATENT DOCUMENTS

| 5,130,598 | A | | 7/1992 | Verheyen et al. |
|---|---|---|---|---|
| 5,479,062 | A | | 12/1995 | Yoshino |
| 5,543,679 | A | | 8/1996 | Morino et al. |
| 5,986,360 | A | * | 11/1999 | Gerken et al. ............... 307/125 |
| 6,212,053 | B1 | * | 4/2001 | Hoffman et al. ......... 361/169.1 |
| 6,435,162 | B1 | * | 8/2002 | Lingl et al. .................. 123/498 |
| 6,441,535 | B2 | * | 8/2002 | Freudenberg et al. .. 310/316.03 |
| 6,459,244 | B1 | * | 10/2002 | Hoffmann et al. .......... 320/166 |

FOREIGN PATENT DOCUMENTS

| DE | 44 35 832 | 4/1996 |
|---|---|---|
| DE | 196 44 521 A1 | 4/1998 |
| DE | 199 00 474 A1 | 7/1999 |
| JP | 62 114 482 | 5/1987 |
| JP | 63 183 250 | 7/1988 |
| JP | 01 209 965 | 8/1989 |
| JP | 02 176 121 | 7/1990 |
| JP | 04 125 083 | 4/1992 |
| JP | 04 308 338 | 10/1992 |
| JP | 06 177 449 | 6/1994 |

* cited by examiner

*Primary Examiner*—Mark O. Budd
(74) *Attorney, Agent, or Firm*—Laurence A. Greenberg; Werner H. Stemer; Ralph E. Locher

(57) ABSTRACT

A capacitive actuator is charged from a charged energy storage capacitor via a transformer by applying pulse width-modulated control signals with a specific voltage, frequency and duty ratio to a charging switch disposed on the primary side. The duration, magnitude and waveform of the actuator voltage can in this case be chosen as required. The actuator can be discharged in the same way.

14 Claims, 2 Drawing Sheets

CIRCUIT AND METHOD FOR DRIVING AT LEAST ONE CAPACITIVE ACTUATOR

CROSS-REFERENCE TO RELATED APPLICATION

This application is a continuation of copending International Application No. PCT/DE00/03206, filed Sep. 14, 2000, which designated the United States.

BACKGROUND OF THE INVENTION

Field of the Invention

The invention relates to an apparatus for driving at least one capacitive actuator, in particular for a fuel injection valve of an internal combustion engine. It also relates to a method for driving the apparatus.

In the known apparatuses for driving capacitive actuators, the charging process includes a ring around process of charging from a charge source via a charging coil to the actuator, with the inductance of the charging coil, together with the capacitances of the charge source and of the actuator, governing a time constant of a charging process and a discharge process (the charging time and discharging time).

An apparatus for driving a capacitive actuator is known from U.S. Pat. No. 5,130,598. In the patent a piezoelectric actuator is charged and discharged from a power source via a charging switch and a coil, using voltage pulses that are dependent on the current flowing through the actuator and the voltage applied to it. The power source must be able to supply at least one voltage corresponding to the maximum actuator voltage that, together with the complex circuit, makes this highly costly.

Patent Abstracts of Japan vol. 017, No. 126(M-1381), Mar. 17, 1993 & JP04308338 A (Nippondenso Co Ltd.), Oct. 30, 1992, discloses an apparatus for charging a capacitive actuator by a transformer. The charging current rises in an unregulated manner and, after reaching a predetermined value, is kept constant by pulse width modulation and the discharge being effected in an unregulated manner, since a resistor via which an acknowledge signal could be effected is not configured as a current measuring shunt.

Patent Abstracts of Japan vol. 012, No. 454(M-769), Nov. 29, 1988 & JP63183250 A (Toyota Motor Corp) Jul. 28, 1988, describes a control circuit for a piezoelectric actuator, in which a pulsed operation is not mentioned. A current measurement that could enable a current regulation is neither present on the primary side nor the secondary side.

U.S. Pat. No. 5,543,679 describes a drive circuit for piezoelectric actuators used in fuel injection valves according to the resonance method, the actuator being charged in a single ring around process of charging via a transformer. The discharge is effected either by dissipating the energy via a further connected coil without energy recovery (FIGS. 1, 7 and 8) or with energy recovery with additional components (FIG. 10: transformer, capacitor, diodes and additional coil).

U.S. Pat. No. 5,479,062 describes a drive circuit for piezoelectric actuators of matrix printers. The driving is effected by a transformer according to the resonance method. Since the needles of such a matrix printer are always actuated as quickly as possible and with the same force, yet not only serially but also in parallel, i.e. simultaneously, there are present for all the piezoelectric actuators a single voltage detector and only one regulating circuit, which, at intervals, monitor the piezoelectric voltage of each individual actuator and adjust the charging current in a manner dependent thereon. However, owing to the parallel driving, each piezoelectric actuator requires a dedicated drive circuit with a transformer and also a charging and discharge switch. The waveform of the charging voltage is not variable; all that is affected is a ring around process with a charging current that brings about a specific actuator voltage. No energy recovery takes place either, since the energy is dissipated in the secondary circuit.

SUMMARY OF THE INVENTION

It is accordingly an object of the invention to provide a method and a circuit for driving at least one capacitive actuator which overcome the above-mentioned disadvantages of the prior art methods and devices of this general type, in which the charging and discharging of at least one capacitive actuator can be performed with largely freely selectable quantities for duration and profile of the charging/discharge process.

With the foregoing and other objects in view there is provided, in accordance with the invention, a method for driving at least one capacitive actuator. The method includes charging the capacitive actuator with a pulse-width-modulated charging current having a predeterminable profile of frequency or a duty ratio with a pulse sequence being continuous or predetermined by omission of individual pulses. The capacitive actuator is discharged with a pulse-width-modulated discharge current with a further predeterminable profile of frequency or a further duty ratio with the pulse sequence being continuous or predetermined by omission of individual pulses.

In accordance with an added mode of the invention, there is the step of determining the duty ratio by way of a pulse duration, which lasts until the pulse-width-modulated charging current reaches a predeterminable value.

In accordance with an additional mode of the invention, there is the step of determining the further duty ratio by way of a pulse duration, which lasts until the pulse-width-modulated discharge current reaches a predeterminable value.

In accordance with a further mode of the invention, there is the step of charging the capacitive actuator from a power source being a DC/DC converter with an adjustable output voltage, and a charging capacitor is connected in parallel with the power source.

In accordance with another mode of the invention, there is the step of charging the capacitive actuator until an actuator voltage associated with a specific charge, a specific amount of energy or a specific change is reached.

In accordance with another added mode of the invention, there is the step of using the capacitive actuator for actuating at least one fuel injection valve of an internal combustion engine.

In accordance with another additional mode of the invention, there is the step of setting the duty ratio and the further duty ratio to be substantially equivalent.

With the foregoing and other objects in view there is provided, in accordance with the invention, an apparatus for controlling at least one actuator. The apparatus includes a control circuit, a power source having a first pole and a second pole, a charging switch connected to the control circuit, a discharging switch connected to the control circuit, a first diode, and a second diode. A transformer is provided and has a primary coil with a first end connected to the first pole of the power source and a second end connected to both the charging switch and the first diode. The first diode is forward-biased toward the primary coil. The transformer has a secondary coil with a first end connected to the actuator and a second end connected to both the discharge switch and to the second diode. The second diode is forward-biased toward the secondary coil. A first measurement device for measuring a primary-side charging current is disposed between the charging switch and the second pole of the power source. The first diode is connected in parallel with a first series circuit containing the charging switch connected in series with the first measurement device. A second measurement device for measuring a secondary-side discharge current is disposed between the discharge switch and the second pole of the power source. The second diode is connected in parallel with a second series circuit containing the discharge switch connected in series with the second measurement device.

Instead of being connected in series circuits, the first diode can be connected in parallel with the charging switch and the second diode can be connected in parallel with the discharge switch.

In accordance with an added feature of the invention, a third measurement device for measuring a secondary-side charging current is disposed in a third series circuit with the actuator.

In accordance with another feature of the invention, a selection switch is connected in series with the actuator, and a third measurement device for measuring a secondary-side charging current is disposed in a series with the selection switch.

In accordance with a concomitant feature of the invention, a fourth measurement device for measuring an actuator voltage is provided.

Other features which are considered as characteristic for the invention are set forth in the appended claims.

Although the invention is illustrated and described herein as embodied in a method and circuit for driving at least one capacitive actuator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
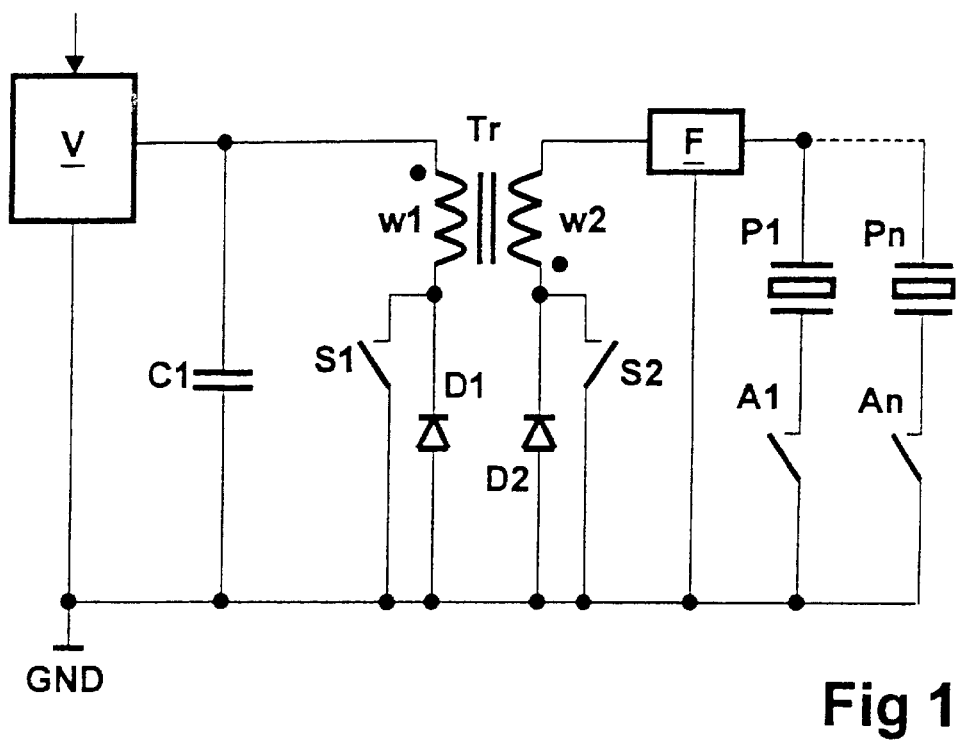
FIG. 1 is a circuit diagram of an apparatus for carrying out a method according to the invention.

Referring now to the figures of the drawing in detail and first, particularly, to FIG. 1 thereof, there is shown an apparatus by which the method according to the invention is to be carried out.

The outline circuit, illustrated in FIG. 1, of the apparatus for driving capacitive actuators P1 to Pn, for example for fuel injection valves of an internal combustion engine, is supplied from a power source. The power source, in this exemplary embodiment, contains a DC/DC converter V, which is fed from a vehicle power supply system voltage and has an adjustable output voltage and an energy storage capacitor C1 which is charged to the respective output voltage of the DC/DC converter V.

A series circuit containing a primary coil w1 of a transformer Tr and a charging switch S1 is connected in parallel with the energy storage capacitor C1. A diode D1, which is forward-biased toward the primary coil w1 from the reference ground potential GND, is disposed between the reference ground potential GND and that connection of the primary coil w1 which is connected to the charging switch S1.

One connection of a secondary coil w2 of the transformer Tr is connected via a discharge switch S2 to the reference ground potential GND, with a further diode D2, which is forward-biased toward the secondary coil w2 from the reference ground potential GND. The further diode D2 is disposed between the reference ground potential GND and that connection of the secondary coil w2 that is connected to the discharge switch S2.

The capacitive actuator P1 that is to be driven is disposed between the other connection of the secondary coil w2 and the reference ground potential GND. If there are a number of actuators P1-Pn, as illustrated in FIG. 1, then these are disposed in parallel with one another, with a selection switch A1 to An, which is connected to the reference ground potential GND, being connected in series with each actuator P1 to Pn.

In a further refinement of the invention, a filter F, for example a low-pass filter, is disposed between the secondary coil w2 and the actuator or the actuators P1-Pn.

Control signals for the charging switch S1, for the discharge switch S2, for the selection switches A1 to An and the control signal for setting the output voltage of the DC/DC converter V are emitted from a control circuit CON which may be part of an engine controller.

The apparatus according to the invention has the advantage that the power source has to produce a considerably lower voltage than the voltage required for the actuator, and that the charging duration and discharge duration, a voltage Up on the actuator in order to produce a specific change, and a charging waveform and discharge waveform of the actuator voltage Up can be fixed as required.

The described apparatus for driving the actuator, in this case the actuator P1 (further actuators are driven in the same way), in this simple form operates according to the method of the invention, is now described.

In an initial state, all the capacitive actuators P1 to Pn are discharged, all the switches S1, S2 and A1 to An are switched off, and the energy storage capacitor C1 is charged to a predetermined output voltage of the DC/DC converter V.

Figure 2:
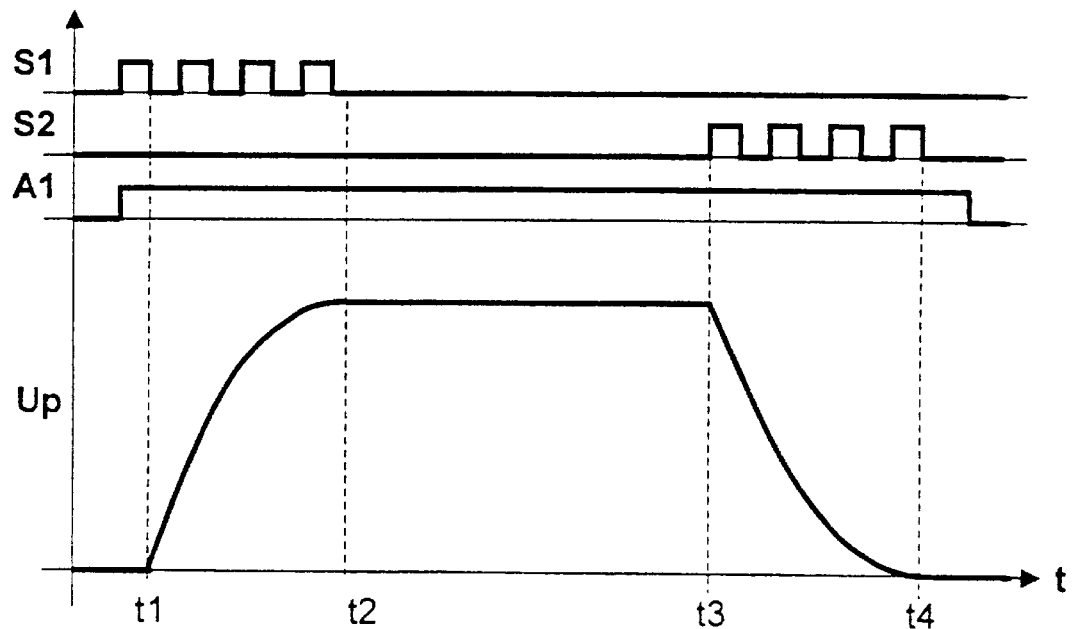
FIG. 2 is a graph of drive signals and of a resultant actuator voltage.

The drive signals for the charging switch S1, for the discharge switch S2 and for the selection switch A1 as well as the resultant actuator voltage Up are shown in FIG. 2.

If the actuator P1 is intended to be charged, the selection switch A1 is switched on at the time when charging starts, and remains switched on until the time t4, at which the actuator P1 is discharged again.

In order to charge the actuator P1, the charging switch S1 is driven at a predetermined frequency and with a predetermined duty ratio in a pulsed mode with a predetermined number of pulse width-modulated signals at a predetermined charging voltage. While the charging switch S1 is switched on, the current through the primary coil w1 rises, and this is terminated at a time t1 by opening (switching off) the charging switch S1.

In this phase when the primary side is switched off, a pulsed voltage, which is smoothed in the filter F, flows via the secondary winding w2 with a current corresponding to the turns ratio w2/w1, and each current pulse continues to charge the actuator P1 until, at a time t2 after the predetermined number of pulses, the predetermined actuator voltage Up has been approximately reached. While the actuator P1 is being charged, the secondary circuit is closed via the selection switch A1 and the diode D2.

The charging time t2-t1, may be, for example, between 100 $\mu$s and 200 $\mu$s and can be varied as a function of the duty ratio, in which case the number of pulses can be matched to the desired actuator voltage Up.

After a time t3, the actuator P1 is likewise discharged by pulse width-modulated signals, by switching the discharge switch S2 on and off in a pulsed manner, as a result of which the actuator voltage Up falls, and tends to zero at a time t4. The discharge time t4-t3 can likewise be varied as a function of the duty ratio.

In this case, the current flows from the actuator via the filter F. the secondary coil w2, the discharge switch S2 and the selection switch A1 back to the actuator P1.

Whenever the discharge switch S2 is opened, some of the discharge energy is transferred to the primary side of the transformer Tr, and is fed back into the energy storage capacitor C1. The primary circuit is closed via the diode D1.

This controlled operation is unsatisfactory since temperature changes and circuit tolerances, in particular in the transformer, results in that the charge voltage, charge energy or charge, and hence the change on the actuator, can be determined only approximately.

Figure 3:
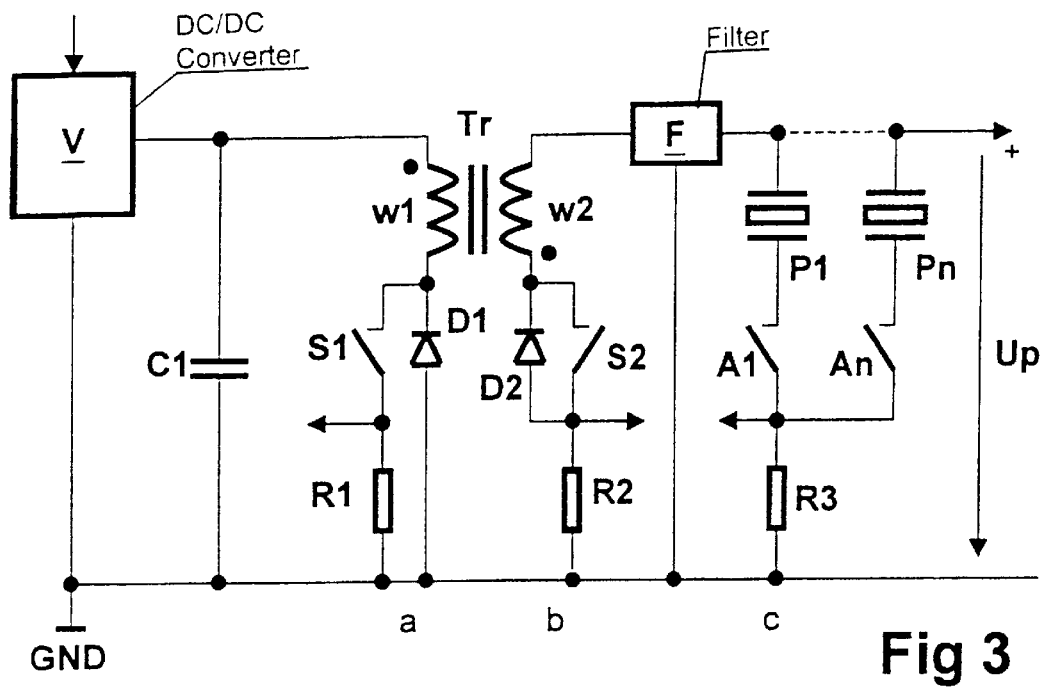
FIG. 3 is a circuit diagram of an improved apparatus.
Figure 3:
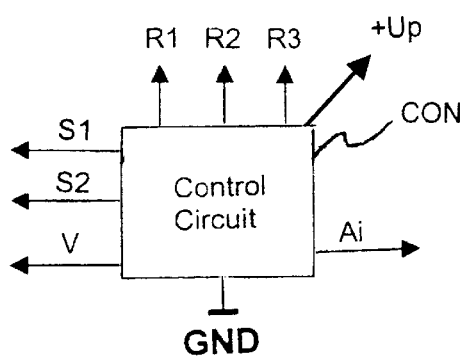

For this reason, a first and a second measurement device in the form of two current measurement resistors R1 and R2 are respectively inserted between the charging switch S1 and the reference ground potential GND, and between the discharge switch S2 and the reference ground potential GND, in the improved circuit shown in FIG. 3. Therefore, the voltage which is dropped across the measurement resistor R1 makes it possible to measure the primary charging current, which is proportional to it, and the voltage which is dropped across the measurement resistor R2 makes it possible to measure the secondary discharge current, which is proportional to it, in the control circuit CON, so that it is then possible to control the charging process or discharge of the actuator P1.

The actuator voltage Up can also be measured and compared with predetermined threshold values. The actuator voltage Up can be identified when the actuator is charged to a voltage which is associated with a specific energy or charge or a specific change. It can also be used for recharging an actuator during a lengthy hold phase (between charging and discharging), when the actuator discharges itself slowly via parasitic resistances.

The diodes D1, D2 can in this case be disposed in parallel with the series circuit containing the charging or discharge switch S1, S2 and the measurement resistor R1 or R2, respectively (see the solution a shown in FIG. 3 with the diode D1). However, alternatively, they may also be disposed only in parallel with the charging or discharge switch S1, S2, respectively, and in series with the respective measurement resistor R1, R2, as shown in solution b of FIG. 3. It is thus possible to use the measurement resistor R1 to measure the charging current on the primary side and, if necessary, to limit it to specific values by comparison with predetermined threshold values. The discharge current on the secondary side can be measured via the measurement resistor R2.

If it is also or alternatively intended to measure the charging current on the secondary side, then a third measurement device, a measurement resistor R3, can be used for this purpose, and is disposed between the reference ground potential and a common junction point of all the selection switches A1 to An, as is illustrated as solution c in FIG. 3.

The second measurement device—the measurement resistor R2—could also be used for measuring the charging current on the secondary side, although in this case a negative voltage would be dropped across it, thus making it necessary to have a more complex measurement circuit.

All the possible forms and durations of the charging curve and discharge curve of the actuator voltage Up for each individual actuator can now be represented by the circuit as a function of the measured variables, by constant values or by variation of the energy storage capacitor voltage, the frequency and the duty ratio of the pulse width-modulated control signals (the latter also by presetting current threshold values for the comparison with the charging or discharge current determined by the measurement resistors R1 and R2 and by the sequence—continuous pulse sequence or omission of individual pulses—for the charging and discharge switches S1 and S2). Each actuator can be driven with a respectively predetermined, constant amount of energy or charge, with an amount of energy or charge matched to the temperature-dependent capacitance of the respective actuator, or with an amount of energy or charge that produces a desired change to the respective actuator.

Furthermore, this makes it possible to compensate for characteristics and tolerances of the circuit, for example characteristics of the core of the transformer Tr.

I claim:

1. A method for driving at least one capacitive actuator, which comprises the steps of:
   using a transformer to charge the capacitive actuator with a pulse-width-modulated charging current having one of a predeterminable profile of frequency and a duty ratio with a pulse sequence being one of continuous and predetermined by omission of individual pulses; and
   using the transformer to discharge the capacitive actuator with a pulse-width-modulated discharge current with one of a further predeterminable profile of frequency and a further duty ratio with the pulse sequence being one of continuous and predetermined by omission of individual pulses.

2. The method according to claim 1, which comprises determining the duty ratio by way of a pulse duration, which lasts until the pulse-width-modulated charging current reaches a predeterminable value.

3. The method according to claim 1, which comprises determining the further duty ratio by way of a pulse duration, which lasts until the pulse-width-modulated discharge current reaches a predeterminable value.

4. The method according to claim 1, which comprises charging the capacitive actuator from a power source being a DC/DC converter with an adjustable output voltage, and a charging capacitor is connected in parallel with the power source.

5. The method according to claim 4, which comprises charging the capacitive actuator until an actuator voltage associated with one of a specific charge, a specific amount of energy and a specific change is reached.

6. The method according to claim 1, which comprises using the capacitive actuator for actuating at least one fuel injection valve of an internal combustion engine.

7. The method according claim 1, which comprises setting the duty ratio and the further duty ratio to be substantially equivalent.

8. An apparatus for controlling at least one actuator, comprising:

a control circuit;

a power source having a first pole and a second pole;

a charging switch connected to said control circuit;

a discharging switch connected to said control circuit;

a first diode;

a second diode;

a transformer having a primary coil with a first end connected to said first pole of said power source and a second end connected to both said charging switch and said first diode, said first diode being forward-biased toward said primary coil, said transformer having a secondary coil with a first end connected to the at least one actuator and a second end connected to both said discharge switch and to said second diode, said second diode being forward-biased toward said secondary coil;

a first measurement device for measuring a primary-side charging current disposed between said charging switch and said second pole of said power source, said first diode connected in parallel with a first series circuit containing said charging switch connected in series with said first measurement device; and a second measurement device for measuring a secondary-side discharge current disposed between said discharge switch and said second pole of said power source, said second diode connected in parallel with a second series circuit containing said discharge switch connected in series with said second measurement device.

9. The apparatus according to claim 8, further comprising a third measurement device for measuring a secondary-side charging current and disposed in a third series circuit with the actuator.

10. The apparatus according to claim 8, further comprising:

a selection switch connected in series with the actuator; and a third measurement device for measuring a secondary-side charging current and disposed in a series with said selection switch.

11. The apparatus according to claim 10, further comprising a fourth measurement device for measuring an actuator voltage.

12. An apparatus for controlling at least one actuator, comprising:

a control circuit;

a power source having a first pole and a second pole;

a charging switch connected to said control circuit;

a discharging switch connected to said control circuit;

a first diode;

a second diode;

a transformer having a primary coil with a first end connected to said first pole of said power source and a second end connected to both said charging switch and said first diode, said first diode being forward-biased toward said primary coil, said transformer having a secondary coil with a first end connected to the at least one actuator and a second end connected to both said discharge switch and to said second diode, said second diode being forward-biased toward said secondary coil;

a first measurement device for measuring a primary-side charging current disposed between said charging switch and said second pole of said power source, said first diode connected in parallel with said charging switch; and a second measurement device for measuring a secondary-side discharge current disposed between said discharge switch and said second pole of said power source, said second diode connected in parallel with said discharge switch.

13. The apparatus according to claim 12, further comprising a third measurement device for measuring a secondary-side charging current and disposed in a series circuit with the actuator.

14. The apparatus according to claim 12, further comprising:

a selection switch connected in series with the actuator; and a third measurement device for measuring a secondary-side charging current and disposed in a series with said selection switch.

* * * * *